(12) United States Patent
Molnar et al.

(10) Patent No.: US 6,694,154 B1
(45) Date of Patent: Feb. 17, 2004

(54) METHOD AND APPARATUS FOR PERFORMING BEAM SEARCHING IN A RADIO COMMUNICATION SYSTEM

(75) Inventors: Karl J. Molnar, Cary, NC (US); Gregory E. Bottomley, Cary, NC (US); Sandeep Chennakeshu, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/971,341

(22) Filed: Nov. 17, 1997

(51) Int. Cl.[7] .............................. H04B 1/38; H04B 7/00
(52) U.S. Cl. ................. 455/562.1; 455/561; 455/277.1; 455/277.2; 455/279.1
(58) Field of Search ................................ 455/561, 562, 455/277.1, 277.2, 279.1, 550, 271, 272, 274, 562.1; 342/371–374, 354

(56) References Cited

U.S. PATENT DOCUMENTS

| | | | |
|---|---|---|---|
| 4,458,247 A | | 7/1984 | Amitay |
| 5,150,384 A | * | 9/1992 | Cahill .......................... 375/97 |
| 5,488,737 A | * | 1/1996 | Harbin et al. ............... 455/33.1 |
| 5,533,011 A | * | 7/1996 | Dean et al. ................... 370/18 |
| 5,596,329 A | * | 1/1997 | Searle et al. ................. 342/374 |
| 5,596,333 A | | 1/1997 | Bruckert |
| 5,625,876 A | | 4/1997 | Gilhousen et al. |
| 5,736,959 A | * | 4/1998 | Patterson et al. ........... 342/354 |
| 5,757,767 A | * | 5/1998 | Zehavi ....................... 370/208 |
| 5,884,145 A | * | 3/1999 | Haartsen ....................... 455/63 |
| 5,907,809 A | * | 5/1999 | Molnar et al. ............... 455/456 |
| 5,911,120 A | * | 6/1999 | Jarett et al. .................. 455/417 |
| 5,956,642 A | * | 9/1999 | Larsson et al. .............. 455/449 |

FOREIGN PATENT DOCUMENTS

| | | | | |
|---|---|---|---|---|
| EP | 0 593 822 A1 | | 4/1994 | |
| EP | 0 786 914 A2 | | 7/1997 | |
| EP | 0 786914 A | * | 7/1997 | ............ H04Q/7/22 |
| GB | 2 295 524 A | | 5/1996 | |
| GB | 2 303 024 A | * | 2/1997 | ............ H04Q/7/38 |
| SE | 470079 B | * | 11/1993 | ........... H04B/17/00 |
| WO | WO94/09568 | | 4/1994 | |
| WO | WO 96/37973 | * | 11/1996 | ............ H04B/7/04 |

OTHER PUBLICATIONS

Uehara, et al., "New Indoor High–Speed Radio Communication System," Proceedings of the Vehicular Technology Conference, Chicago, vol. 2, NR, Conf. 45, Jul. 1995, pp. 996–1000.

Swales, et al., "The Performance Enhancement of Multi-beam Adaptive Base–Station Antennas for Cellular Land Mobile Radio Systems," IEEE Transactions on Vehicular Technology, vol. 39, No. 1, Feb. 1990, pp. 56–67.

(List continued on next page.)

Primary Examiner—William Trost
Assistant Examiner—Meless M Zewdu
(74) Attorney, Agent, or Firm—Coats & Bennett, P.L.L.C.

(57) ABSTRACT

A radio communication system includes a base station having a directional antenna for generating a plurality of beams. A first set of the beams is used to receive signals which are decoded at the base station. A second set of the beams is used for interrogating a cell to identify beams which should be added to the first set of beams (for example, in response to mobile terminals entering the cell). In one embodiment, the second set of beams comprises a plurality of searcher beams produced by a fixed-beam phased array antenna. In a second embodiment, the second set of beams comprises a single searcher beam which is scanned through the cell by an adaptive phased array antenna. The radio communication system can be used to communicate with indoor mobile terminals through a plurality of radio heads, and also can be used to communicate with orbiting satellites.

55 Claims, 9 Drawing Sheets

OTHER PUBLICATIONS

Winters, "Signal Acquisition and Tracking with Adaptive Arrays in the Digital Mobile Radio System IS–54 with Flat Fading," IEEE Transactions on Vehicular Technology, vol. 42, No. 4., Nov. 1993, pp. 377–384.

Simanapalli, "Adaptive Array Methods for Mobile Communication," Proc. 44$^{th}$ IEEE Veh. Technol. Conf., Stockholm, Sweden, Jun. 7–10, IEEE publication No. 0–7803–1927, pp. 1503–1506.

Bottomley et al., "Adaptive Arrays and MLSE Equalization," Proc. VTC '95, Chicago, Illinois, Jul. 1995, IEEE publication No. 0–7803–2742–X/95, pp. 50–54.

Garg et al., Applications of CDMA in Wireless/Personal Communications, Prentice Hall, 1997, pp. 332–334.

* cited by examiner

METHOD AND APPARATUS FOR PERFORMING BEAM SEARCHING IN A RADIO COMMUNICATION SYSTEM

BACKGROUND

The present invention pertains to a system and method for efficiently cancelling interference in a radio communication system using a directional antenna and one or more search beams.

FIG. 1 illustrates a conventional cellular radio communication system 100. The radio communication system 100 includes a plurality of radio base stations 170a–n connected to a plurality of corresponding antennas 130a–n. The radio base stations 170a–n in conjunction with the antennas 130a–n communicate with a plurality of mobile terminals (e.g. terminals 120a, 120b and 120m) within a plurality of cells 10a–n. Communication from a base station to a mobile terminal is referred to as the downlink, whereas communication from a mobile terminal to the base station is referred to as the uplink.

The base stations are connected to a mobile telephone switching office (MSC) 150. Among other tasks, the MSC coordinates the activities of the base stations, such as during the handoff of a mobile terminal from one cell to another. The MSC, in turn, can be connected to a public switched telephone network 160, which services various communication devices 180a, 180b and 180c.

A common problem that occurs in a cellular radio communication system is the loss of information in the uplink and downlink signals as a result of multi-path fading, which results when the transmitted signal travels along several paths between the base station and the intended receiver. When the path lengths between the base station and the mobile terminal are relatively small, the multiple signal images arrive at almost the same time. The images add either constructively or destructively, giving rise to fading, which typically has a Rayleigh distribution. When the path lengths are relatively large, the transmission medium is considered time dispersive, and the added images can be viewed as echoes of the transmitted signal, giving rise to intersymbol interference (ISI).

Fading can be mitigated by using multiple receive antennas and employing some form of diversity combining, such as selective combing, equal gain combining, or maximal-ratio combining. Diversity takes advantage of the fact that the fading on the different antennas is not the same, so that when one antenna has a faded signal, chances are the other antenna does not. ISI from multi-path time dispersion can be mitigated by some form of equalization, such as linear equalization, decision feedback equalization, or maximum likelihood sequence estimation (MLSE).

Interference can also degrade the signals transmitted between a base station and mobile terminals. For instance, a desired communication channel between a base station and a mobile terminal in a given cell can be degraded by the transmissions of other mobile terminals within the given cell or within neighboring cells. Other base stations or RF-propagating entities operating in the same frequency band can also create interference (through "co-channel" or "adjacent channel" interference).

Frequency re-use can be used to mitigate interference by locating interfering cells as far from each other as possible. Power control can also be used to reduce the interference by ensuring that transmitters communicate at minimal effective levels of power. Such power control techniques are especially prevalent in code-division multiple access systems, due to the reception of information in a single communication channel at each base station.

Interference can be reduced still further by using a plurality of directional antennas to communicate with mobile terminals within a cell. The directional antennas (also known as "sector antennas") transmit and receive energy within a limited geographic region, and thereby reduce the interference experienced by those radio units outside such geographic region. Typically, radio communication cells are partitioned into three 120° sectors serviced by three sector antennas, or six 60° sectors serviced by six sector antennas. Even smaller antenna sectors can be achieved using a fixed-beam phased array antenna, which transmits and receives signals using a plurality of relatively narrow beams. FIG. 2, for instance, illustrates such an exemplary radio communication system 200 including a radio base station 220 employing a fixed-beam phased array (not shown). The phased array generates a plurality of fixed narrow beams ($B_1$, $B_2$, $B_3$, $B_4$, etc.) which radially extend from the base station 220. Preferably, the beams overlap to create a contiguous coverage area to service a radio communication cell. Although not shown, the phased array can actually consist of three phased array sector antennas, each of which communicates with a 120° swath extending from the base station 220.

FIG. 2 shows a mobile terminal 210 located within the coverage of one of the beams, $B_1$. Communication proceeds between the base station 220 and this mobile terminal 210 using the beam $B_1$, or perhaps, in addition, one or more adjacent beams. The reader will appreciate that modern radio communication environments typically include many more mobile terminals within cells. Nevertheless, even when there are plural mobile terminals within a cell, a subset of the beams may not include any mobile terminal stations within their coverage. Hence, in conventional fixed-beam phased array systems, these beams remain essentially idle until a mobile terminal enters their assigned geographic region. Such idle beams propagate needless energy into the cell, and thus can contribute to the net interference experienced by radio units within the cell as well as other cells (particularly neighboring cells). These beams also add to the processing and power load imposed on the base station 220.

These concerns are partly ameliorated though the use of a variation of the above-discussed system, referred to as "adaptive" phased arrays. Such arrays allow for the selective transmission and reception of signals in a particular direction. For instance, as shown in FIG. 3, an array 300 can be used to receive a signal transmitted at an angle κ (with respect to the normal of the array) from a target mobile terminal 380, and can simultaneously cancel the unwanted signals transmitted by another mobile terminal 370. This is accomplished by selecting weights ($w_1$, $w_2$, . . . $w_n$) applied to each signal path ($r_1$, $r_2$, . . . $r_3$) from the phase array antenna 300 so as to increase the sensitivity of the array in certain angular directions and reduce the sensitivity of the array in other directions (such as by steering a null toward an interference source). The desired weighting is selected by iteratively changing the weights through a feedback loop comprising beamforming unit 340, summer 330 and controller 320. The feedback loop functions to maximize signal-to-interference ratio at the output "x" of the beamforming unit. Application of an adaptive phased array antenna to the radio communication system shown in FIG. 1 would result in the generation of a single beam (or small subset of beams) generally oriented in the direction of the single mobile terminal 210. Such a system offers a substantial reduction in interference. For example, as disclosed in "Applications of CDMA in Wireless/Personal Communications" by Garg et al., Prentice Hall, 1997, an idealized eight-beam antenna could provide a threefold increase in network capacity when compared with existing schemes such as cell splitting (pp. 332–334). Interested readers are referred to the following documents for further details regarding adaptive phased arrays as well as information regarding adaptive diversity arrays: "Adaptive Arrays and MLSE Equalization" by G. E. Bottomley et al., Proc. VTC '95, Chicago, Ill., July 1995, pp. 50–54; "Signal Acquisition and Tracking with Adaptive Arrays in the Digital Mobile Radio System IS-54 with Flat Fading" by J. H. Winters, IEEE Transactions on Vehicular Technology, Vol. 42, No. 4, November 1993; "Adaptive Array Methods for Mobile Communication" by S. Simanapalli, Proc. 44th IEEE Veh. Technol. Conf., Stockholm, Sweden, Jun. 7–10, 1994, pp. 1503–1506; and published patent application No. WO 94/09568 to P. H. Swett et al., published 1994.

The presence and location of mobile terminals in both the fixed and adaptive beamforming cellular radio communication systems can be determined by measuring the signal strength in the uplink direction on each beam. The beam direction yielding the strongest received signal would indicate the probable location of the desired mobile. This technique, however, is not fully satisfactory. Often, for instance, due to multi-path fading, the beam yielding the strongest signal may not precisely correspond to the direction of the mobile user. Even if the strongest beam does correspond to the direction of the mobile user, the presence of multi-path fading and interference on other beams may degrade the quality of communication between the base station and the mobile terminal using the strongest beam. Furthermore, successively examining each beam generated by the phased array to locate a mobile user requires a significant amount of processing overhead. This overhead can reduce the response time of the base station.

It is therefore an exemplary objective of the present invention to provide a method and system for conducting communication between two radio units which does not suffer from the above-described drawbacks.

SUMMARY OF THE INVENTION

According to a first exemplary aspect of the present invention, the above objective is achieved through a base station using a fixed-beam phased array antenna which employs a first set of beams and associated hardware for conducting communication with a set of mobile terminals within a radio communication cell, and employs a second set of beams and associated hardware for searching the radio communication cell for the presence of candidate beams which should be added to the first set of beams. In the following discussion the beams in the first set are referred to as "decoding beams", while beams in the second set are denoted "searcher beams".

According to a second exemplary aspect of the present invention, subsets of the decoding beams are processed by an equalizer, and are preferably processed by the interference-rejection-combining receiver disclosed in commonly assigned U.S. application Ser. No. 07/284,775, filed on Feb. 8, 1994. This receiver combines signals received from each subset of decoder beams and separates the wanted signals from the unwanted (interfering) signals.

According to a third exemplary aspect of the present invention, the base station determines the "membership" of each subset of decoder beams by successively examining each beam within the searcher set of beams. Those searcher beams (or combination of searcher beams) which meet prescribed criteria are selected and allocated to the task of processing a call from a mobile terminal. The beam is "allocated" in the sense that its associated hardware (e.g. comprising filters, downconverters, etc.) is allocated to the task of processing the call.

According to a fourth exemplary aspect of the present invention, the searcher beams and their associated hardware are used to determine the presence of new mobile terminals within a cell, including those terminals which have entered the cell from a neighboring cell, and those terminals which have initiated calls within the cell. The searcher beams and associated hardware are also used to determine the departure of terminals within a cell, including those terminals which have physically left the cell and those terminals which have simply terminated calls within the cell.

According to a fifth exemplary aspect of the present invention, the receiver/equalizer also interrogates the allocated decoder beams to determine whether these beams continue to possess signal characteristics which warrant their membership in the decoder set of beams. If a decoder beam no longer meets the prescribed criteria, it is returned to the searcher pool of beams. Thus, the allocation of beams (and associated hardware) to the decoder beam set and the searcher beam set is a dynamic process which takes into account all activity within the cell and outside the cell which affects the interference profile within the cell. According to one exemplary criterion, searcher beams are converted into decoder beams when they contain signal strength and/or signal quality characteristics above a prescribed threshold.

According to a sixth exemplary aspect of the invention, instead of a fixed beamforming phased array antenna, the base station can employ an adaptive phased array antenna. In this embodiment, a single searcher beam can be used to interrogate the cell to recruit candidates for inclusion in the decoder set of beams and to determine out-of-date members in the decoder set of beams. By appropriate weighting of the phased array, the base station steers the single searcher beam over a prescribed swath of geographic coverage. In alternative exemplary embodiments, more than one searcher beam can be employed.

According to a seventh exemplary aspect of the invention, the above-described cellular techniques can be employed in the indoor cellular environment. In this case, the radio heads are divided into a first set of decoder radio heads which are allocated to the task of processing calls, and a second set of radio heads which are allocated to the task of ensuring that the decoder set of radio heads remains optimal or near-optimal. Again, the signals provided by the decoder set of radio heads are processed using a receiver, preferably using the interference-rejection-combining receiver mentioned above.

According to an eighth exemplary aspect of the invention, the above-described cellular techniques can be used by a base station to locate one or more orbiting satellites by employing a decoder set of beams which are assigned for communicating with one or more satellites and a second searcher set of beams for canvassing a sector of space to ensure that the decoder beams remain optimal or near-optimal by recruiting searcher beams which meet prescribed criteria for inclusion in the decoder set of beams and rejecting decoder beams which fail to meet the prescribed criteria.

BRIEF DESCRIPTION OF THE DRAWINGS

The foregoing objects, features and advantages of the present invention, as well as other features, will be more readily understood upon reading the following detailed description in conjunction with the drawings in which.

DESCRIPTION OF THE PREFERRED EMBODIMENTS

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed over a number of time slots. However, those skilled in the art will appreciate that the concepts disclosed herein find use in other protocols, including, but not limited to, frequency division multiple access (FDMA), code division multiple access (CDMA), or some hybrid of any of the above protocols.

A. Cellular Radio Communication with Fixed Beamforming

Figure 4:
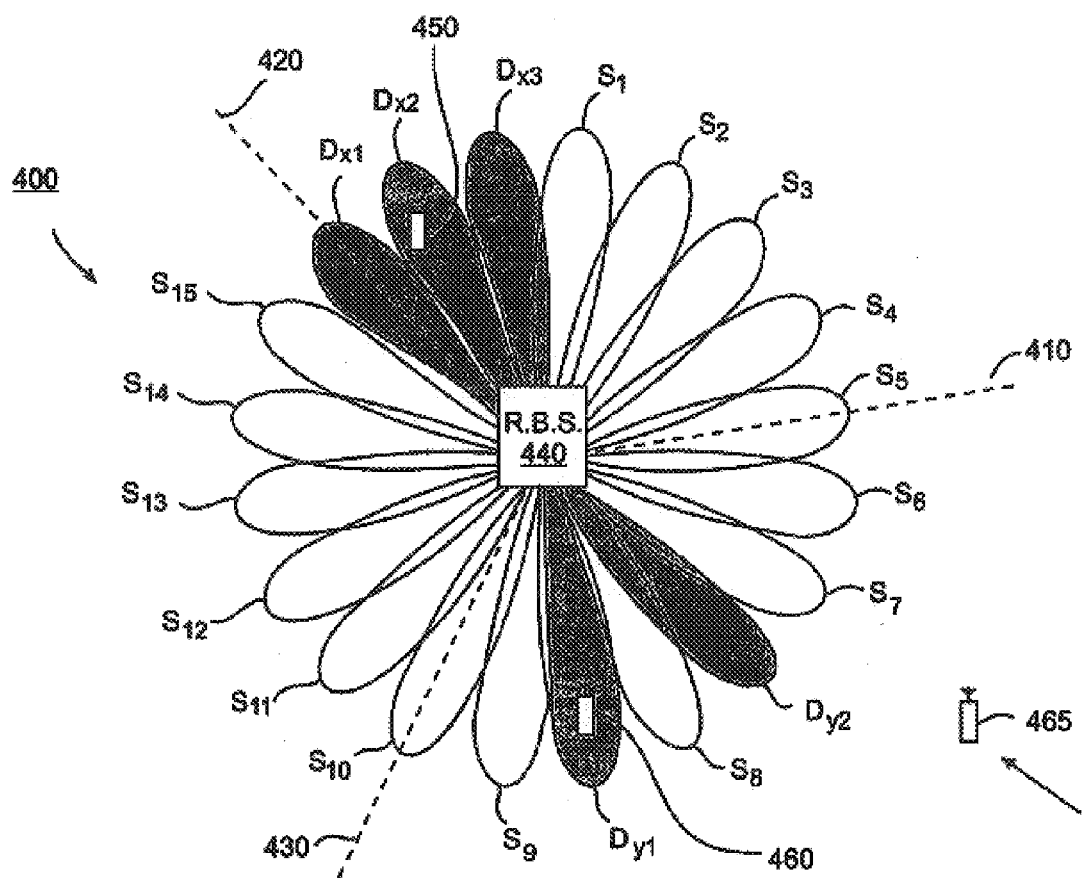
FIG. 4 shows a base station which uses a phased array with a fixed beamforming processor according to exemplary aspects of the present invention.
Figure 5:
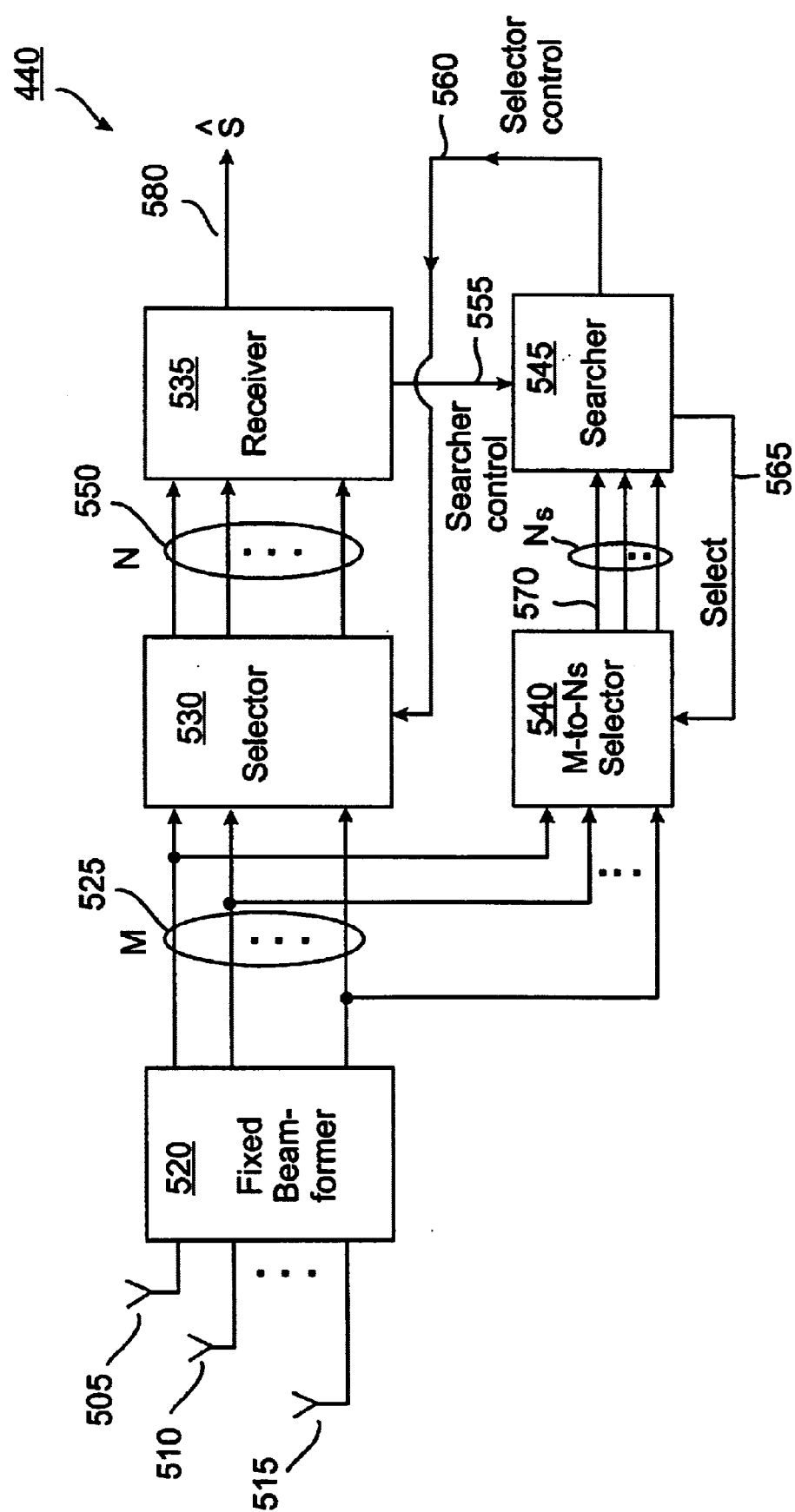
FIG. 5 shows an exemplary block diagram of processing circuitry used by the base station of FIG. 4.
Figure 6:
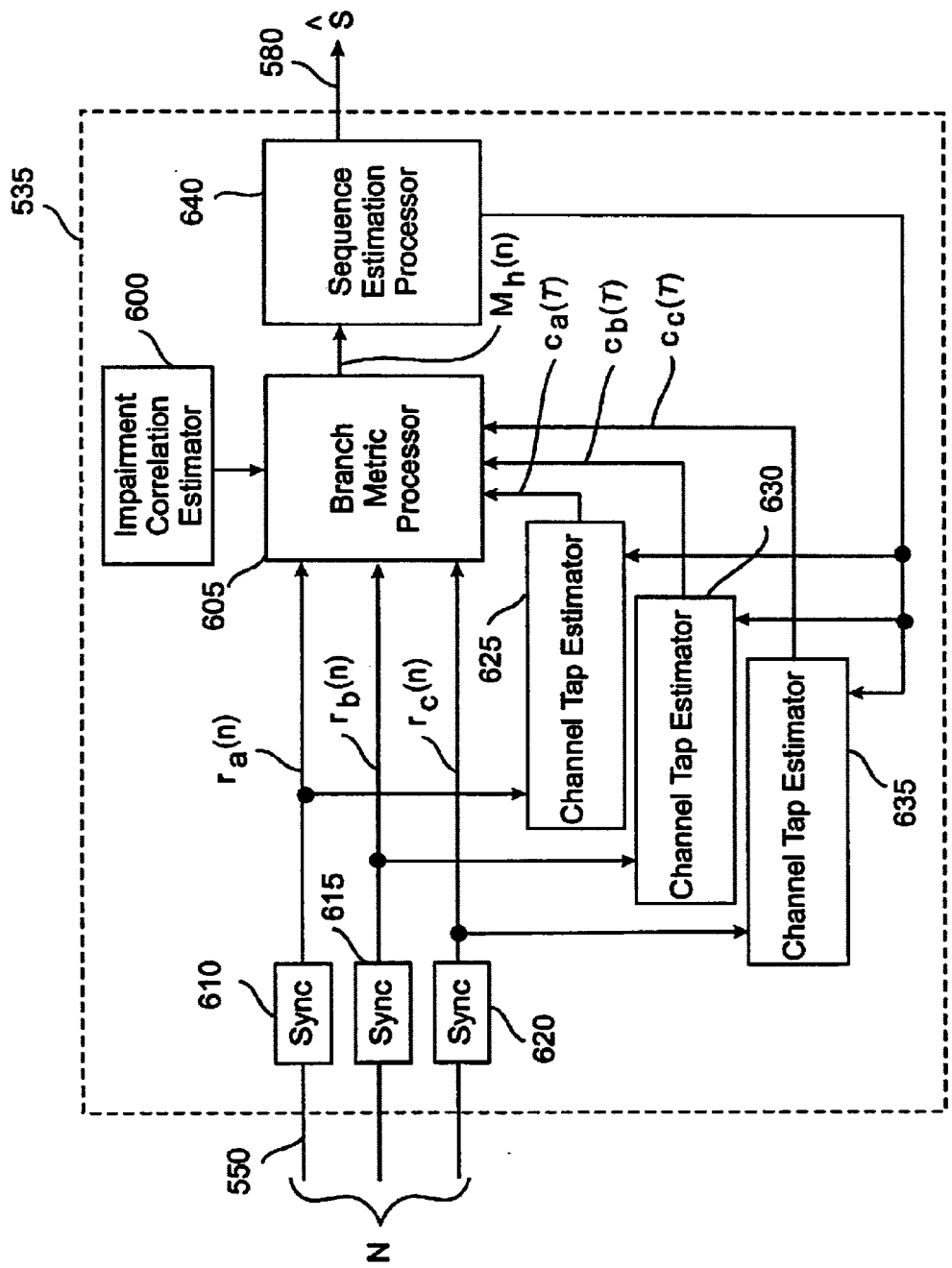
FIG. 6 shows an exemplary block diagram of an interference-rejection-combining receiver for use in the base station circuitry of FIG. 5.

FIGS. 4–6 illustrate a first exemplary embodiment of the present invention which entails the use of a base station 440 having a directional antenna to generate a plurality of narrow beams, which centrally radiate from the base station 440. The directional antenna is controlled by a fixed beamformer such that the beams are positioned at fixed locations. The number, strength, weighting, and coverage area of each beam can be selected so that the beams collectively provide the required coverage for a particular application. One or more phased arrays can be employed to achieve the desired coverage, or other types of directional antennas can be used instead of a phased array. In the example of FIG. 4, three separate sector antennas spanning 120° sectors are used, each of which generates a plurality of narrow beams using a phased array or other type of directional antenna. These sector boundaries are demarcated by lines 410, 420 and 430.

The base station 440 shown in FIGS. 4–6 projects a first set of beams referred to as "decoder beams". The decoder beams (denoted by the symbol "D") are used for processing a call from one or more mobile stations. Each of the decoder beams is preferably allocated a "receiver chain" of processing modules (not shown) for processing and conditioning the signals received from the respective beams, including, for example, an amplifier, downconverter, filter, digital-to-analog converter, etc. Thus, reference to the use of decoder beams to process calls from mobile terminals also implies the allocation of a dedicated receiver chain for processing such calls. In FIG. 4, beams $D_{x1}$, $D_{x2}$ and $D_{x3}$ are used to transmit and receive signals to and from, respectively, at least mobile terminal 450. Beams $D_{y1}$ and $D_{y2}$ are used to transmit and receive signals to and from, respectively, another mobile terminal 460. Transmission may employ a subset of these beams.

Subsets of the decoding beams are processed by receiver 535 in FIG. 5. Receiver design depends on the modulation used and the performance needed. For illustrative purposes, we have assumed MLSE reception of narrow-band signals. However, the receiver can be any type. For example, for direct-sequence spread-spectrum systems, the receiver can be a correlator or Rake receiver. For differentially modulated systems, a differential detector can be used. Any form of coherent or noncoherent receiver is possible.

According to preferred embodiments, an interference-rejection-combining (IRC) receiver disclosed in commonly assigned U.S. application Ser. No. 07/284,775, filed on Feb. 8, 1994, is used to process the signals provided by the decoder beams. This receiver combines signals received from each subset of decoder beams and separates the wanted signals from the unwanted (interfering) signals. This receiver will be discussed in further detail below. The following commonly assigned U.S. applications disclose IRC concepts and are incorporated in their entireties by reference herein: Ser. No. 08/284,775, filed on Aug. 2, 1994; Ser. No. 08/577,337, filed on Dec. 22, 1995; Ser. No. 08/634,719, filed on Apr. 19, 1996; and Ser. No. 08/655,930, filed on May 31, 1996. Interference-rejection-combining is primarily discussed herein with reference to the uplink, but can be used to improve the quality of the downlink transmission as well, as discussed at length in the above-referenced U.S. application Ser. No. 08/655,930.

FIG. 4 also shows a second set of beams referred to as "searcher beams", denoted by $S_1$–$S_{15}$. To facilitate illustration, in all Figures the decoder beams are shaded, whereas the searcher beams are not shaded. The base station uses the searcher beams to select candidates which should be added to the set of currently active decoder beams by successively examining each beam within the searcher set of beams. Those searcher beams (or combination of searcher beams) which meet prescribed criteria are selected and allocated to the task of processing a call from a mobile terminal. Once again, the beam is allocated in the sense that its associated hardware (e.g. comprising filters, downconverters, etc.) are allocated to the task of processing the call.

The searcher beams and their associated hardware are also used to determine the presence of new mobile terminals within a cell, including those terminals which have entered the cell from a neighboring cell (as will be the case with terminal 465), and those terminals which have initiated calls within the cell. The searcher beams and associated hardware also provide assistance in determining the removal of terminals from a cell, including those terminals which have physically left the cell and those terminals which have simply terminated calls within the cell.

The receiver 535 also interrogates the allocated decoder beams to determine whether these beams continue to possess signal characteristics which warrant their "membership" in the decoder set of beams. If a decoder beam no longer meets the prescribed criteria, it is returned to the searcher pool of beams. Thus, the allocation of beams (and associated hardware) to a decoder beam set and the searcher beam set is a dynamic process which takes into account all activity within the cell and outside the cell which affects the interference profile within the cell.

Various criteria can be used to determine whether a searcher beam should be added to the active set of decoder beams. For instance, the base station 440 can "convert" a searcher beam to a decoder beam when the strength of the searcher beam exceeds a prescribed value. The interference-rejection-combining receiver works best when it receives the collection of beams having the strongest interfering signals. Thus, the base station 440 would, in addition to identifying strong signals attributed to the wanted signal (e.g. from terminal 460 using beam $D_{y1}$), might also select one or more nearby beams (e.g. beam $D_{y2}$) which contains a strong interfering signal (e.g. attributed to terminal 465). Because of multi-path fading effects and other types of interference phenomena, the selected subsets of decoder beams may not all be adjacent to one another (as in the case with decoder beams $D_{y1}$ and $D_{y2}$). The strength can be gauged by measuring the amount of energy collected from the searcher beam over a certain period of time, such as over a slot, multiple slots, or a portion of a slot.

In another embodiment, the base station 440 can "convert" a searcher beam to a decoder beam when the quality of the searcher beam meets certain criteria. Quality can be gauged, as well known in the art, by measuring the correlation of a received signal with a known pattern word. For instance, digital transmissions typically include sync words at predetermined slots within the transmissions. The quality of the received signal can be determined by correlating the received signal with a sync word. The quality measure can also be used by the receiver 535 to identify those beams which should be removed from the active set of decoder beams by identifying those beams having negligible amounts of wanted signal.

In another embodiment, a hybrid of strength measurements and quality measurements can be used to select the desired set of decoder beams. For instance, the strength measure can be used identify the presence of mobile terminals within an area and select the primary beams for interference-rejection-combining. The quality measurement can be used to identify those weaker beams, e.g. attributed to multi-path propagation, which may contain some wanted signal.

In still another embodiment, the introduction of new mobile terminals into the cell (or the initiation of new calls within the boundaries of a cell) can be determined by detecting the presence of random access channel (RACH) transmissions from new mobile terminals. The random access channel RACH is used by the mobiles to request access to the system. The RACH logical channel is a unidirectional uplink channel (from the mobile terminal to the base station), and is shared by separate mobile terminals (one RACH per cell is sufficient in typical systems, even during periods of heavy use). Mobile units continuously monitor the status of the RACH channel to determine if the channel is busy or idle. If the RACH channel is idle, a mobile unit desiring access sends its mobile identification number, along with the desired telephone number, on the RACH to the base station. The MSC receives this information from the base station and assigns an idle voice channel to the mobile station, and transmits the channel identification to the mobile terminal through the base station so that the mobile terminal can tune itself to the new channel.

There are typically hardware constraints which restrict the quantity and frequency of processing which can be performed on the signals received by the numerous searcher beams. In view thereof, the base station can lower the "duty cycle" of the processing of the searcher beams. The term "duty cycle" pertains to the amount of time spent by the base station in searching for new mobile terminals. The duty cycle is a function of the frequency at which each searcher beam is revisited and the amount of time spent processing each searcher beam upon each visit.

The duty cycle can be lowered by examining only a subset of available searcher beams in each slot. The subset of beams processed in each slot can be varied according to a prescribed schedule, or can be varied in a random manner. The duty cycle of searcher beam processing can also be adjusted by varying the amount of coding and interleaving used to process the signals received from and/or transmitted by the searcher beams. A longer duty cycle can be achieved by adding to the amount of coding and interleaving performed on signals. For instance, coding (such as repeat coding) tends to add some memory into the transmission in terms of spreading bits over a longer period of time. This means that shorter duty cycles can be achieved by cutting back on the amount of such coding.

According to other exemplary embodiments, the duty cycle at which searcher beams are processed can also be optimally selected by determining the speed at which mobile terminals move through a cell, which, in turn, can be gauged from the measured Doppler shift of signal transmissions emanating from mobile terminals within the cell. The speed can also be known (e.g., it can be assumed that a cell along a highway will include mobiles moving at a high rate of speed). More specifically, the frequency at which the searcher beams are interrogated is selected on the basis of the speed at which the majority of the mobile terminals are traveling through a cell. For instance, the searcher beams in cells allocated to fast-moving highway traffic may have to be interrogated on a relatively frequent basis. Searcher beams in cells having a less dynamic environment can be updated on a less frequent basis.

Figure 1:
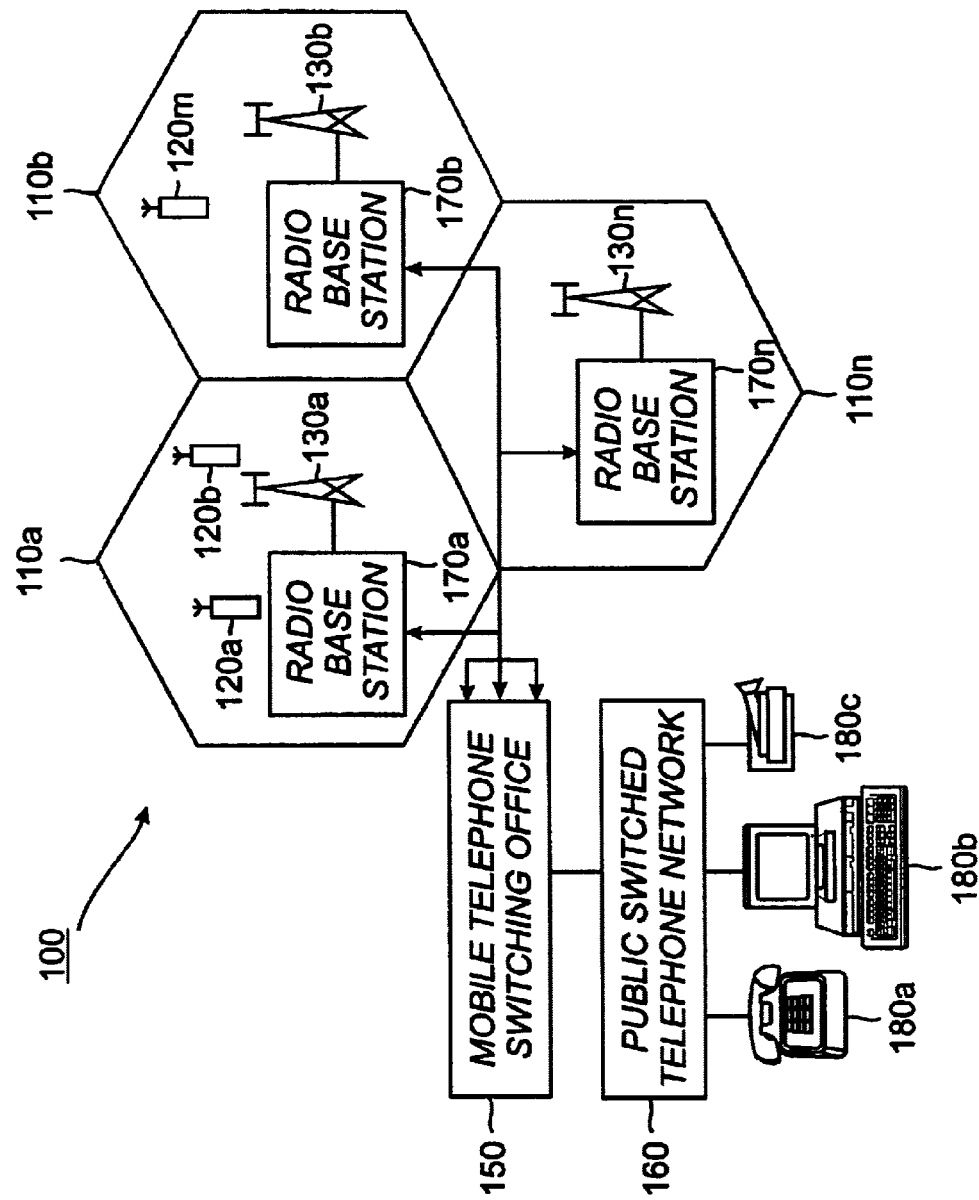
FIG. 1 shows a conventional radio communication system including plural base stations and a central switching center.

The measure of signal strength and/or quality can also be used to determine when to handoff a call from a mobile terminal from one cell to another. For instance, when the receiver 535 detects that the signal strength and/or quality for an on-going call decreases below a prescribed threshold, it can notify a central switching center (e.g. as shown in the prior art context in FIG. 1). The switching center will then coordinate a handoff by informing an adjacent cell to take over the call. If the switching center is informed of what beam or beams a current base station is using to communicate with a mobile terminal, the switching center can also inform a neighboring base station which beam or beams it should use to resume the call after handoff. This function can be implemented, for instance, on the basis of prestored information which indicates which specific beams of a current cell overlap the beams of a neighboring cell. In the CDMA environment, the mobile station can simultaneously receive transmissions from plural base stations within these overlap regions.

In yet another embodiment, the receiver 535 can be used to track the locations of mobile terminals as they move within the cell. Based on the projected paths of the terminals, or trends in interference caused by their mutual interaction, the receiver 535 can instruct the base station 440 to modify its set of decoder means so as to minimize any degradation in the calls. This function can be performed in an iterative manner such that, through trial and error, a more suitable set of decoder beams offering improved signal-to-interference ratio is selected, or by reference to some type of knowledge base in which rules are stored regarding proper selection of decoding beam patterns for prescribed input conditions.

Exemplary circuitry for carrying out the above-described functions will now be discussed with reference to FIGS. 5 and 6. FIG. 5 shows a circuit including an antenna comprising a plurality of antenna elements (e.g. 505, 510 and 515). The antenna can comprise a phased array antenna as discussed above, or some other directional antenna for producing a plurality of beams. The individual antenna elements (e.g. 505, 510, 515) are connected to a fixed beamformer unit 520, which shapes and steers the plurality of beams to achieve a desired coverage area, such as to achieve the fixed beam configuration shown in FIG. 1. The beamformer can comprise any conventional fixed beamformer, such as a Butler matrix. The conventional beamformer is implemented using analog hardware. Alternatively, digital beamforming can be used. In the present embodiment, digital beamforming is used in the front-end at some intermediate frequency or appropriately down-converted signal. This requires that the signals remain coherent up to the beamforming stage. Alternatively, the digital beamforming can be performed further away from the front-end of the system. For example, beamforming can be performed in the baseband signals after filtering and down-conversion. However, such an approach is more complex due to the need to maintain coherency of the signals over a longer processing path.

Although not shown, other processing units comprising "receiver chains" can be incorporated at the beamformer processing stage or at later points in the transmission path. As well known in the art, such receiver chains can comprise various amplifiers, filters, downconverters, analog-to-digital converters, etc., as will be apparent to those skilled in the art. Each beam can include a respective receiver chain allocated thereto. However, to reduce hardware costs and processing complexity, the number of receiver chains may be less than the number of antenna elements.

In the receive path, the output of the beamformer 520 comprises a plurality of "M" signals. The M signals 525 are fed into a selector 530 which selects a number "N" 550 of the M input signals. These N signals, in turn, are fed to a receiver 535 which collectively analyzes the information in the N signals, and, therefrom, extracts the desired signals from the unwanted signals. Any type of equalizer, combiner or detector can be used for the receiver 535. Preferably, an interference-rejection-combining processor (to be discussed shortly hereinbelow) is used.

The selector 530 bases its selection of the N signals on the output ("selector control" 560) of a searcher circuit 545. The searcher circuit 545 is used to successively examine each of a current pool of searcher beams. It performs this task by generating and transmitting a selection signal 565 to a M-to-N, selector 540 (e.g., which can comprise, in one embodiment, a M-to-1 selector). In response to the selection signal, the M-to-N, selector 540 passes $N_s$ (where $N_s$ is an integer $N_s \leq M$) of the M input signals 525 to the searcher circuit 545 on line 570 for analysis therein. The specific analysis performed on each searcher beam by the searcher circuit 545 can comprise strength analysis and/or quality analysis, as discussed above, or some other type of analysis.

The searcher circuit 545 also receives a searcher control input 555 from the receiver 535. This input can, among other control functions, identify those beams which are within the current set of decoder and searcher beams, and can particularly identify those decoder beams which are being reallocated to the searcher pool of beams. The receiver 535 can also forward raw data to the search circuit 545. However, the bulk of the beam selection analysis is performed by the searcher circuit, since it has more beams available to it than the receiver circuit 535.

The output 560 of the searcher circuit 545 is feed back to the selector 530, which commands the selector 530 to select a beam or beams meeting prescribed criteria for decoding using the receiver 535. The output of the receiver 535 is a signal S which represents the wanted signal with as much as the unwanted signal removed as possible. The portions of the circuit shown in FIG. 5 which are responsible for the selection and de-selection of decoder beams can be collectively regarded as an "evaluator circuit", while the portions of the circuit which perform the actual demodulation and/or interference cancellation functions can be referred to as the "decoder". The functions attributed to these circuits can be implemented using a suitably programmed microprocessor or with a combination of discrete logic devices, as will be apparent to those skilled in the art.

The details of the receiver can be found in the above-referenced interference-rejection-combining (IRC) patent applications, each of which is incorporated herein in its entirety. FIG. 6 shows exemplary aspects of one embodiment of the IRC receiver. The N received radio signals 550 generated by the selector 530 are fed into the receiver 535. For the sake of simplicity, only three of the N signals are illustrated in FIG. 6, although it should be noted that, generally, two or more signals can be included.

The received sample streams 550 (also denoted by $r_a(n)$, $r_b(n)$ and $r_c(n)$ are coupled to a signal pre-processor, or sync, blocks 610, 615 and 620, respectively, where the received signal sample streams are correlated with known timing/synchronization sequences embedded in the received radio signals according to known techniques. Joint synchronization is also possible. The received signal sample streams are also coupled to channel tap estimators 625, 630 and 635 to produce channel tap estimates $c_a(\tau)$, $C_b(\tau)$ and $C_c(\tau)$ which are used to model the radio transmission channel associated with each antenna element. Initial channel tap estimates can be obtained from sync correlation values or least-squares estimation according to known techniques. Subsequently, known channel tracking techniques can be used to update the channel estimates, e.g., using received data and tentative symbol estimate values generated in the sequence estimation processor 640. Joint channel estimation is also possible.

The channel tap estimates $c_a(\tau)$, $C_b(\tau)$ and $C_c(\tau)$ are input to the branch metric processor 605. The branch metric processor 605 forms branch metrics which are used by sequence estimation processor 640 to develop tentative and final estimates of the transmitted information symbol sequences. Specifically, hypothesized symbol values are filtered by channel tap estimates from blocks 625, 630 and 635 to produce hypothesized received samples for each antenna. The differences between the hypothesized received information and the actual received information from blocks 610, 615 and 620, referred to as the hypothesis errors, give an indication of how good a particular hypothesis is. The squared magnitude of the hypothesis error is used as a metric to evaluate a particular hypothesis. The metric $M_h(n)$ is accumulated for different hypotheses for use in determining which hypotheses are better using the sequence estimation algorithm, for example, the Viterbi algorithm.

Also coupled to the branch metric processor 605 is an estimate of the impairment correlation properties obtained from impairment correlation estimator 600. The estimate of the impairment correlation properties comprises information regarding the instantaneous impairment correlation properties between the antenna elements. The impairment correlation estimator uses impairment process estimates to update and track the estimate of the impairment correlation properties. As distinguished from conventional techniques, branch metrics formed by processor 605 are improved by taking into account the correlation between the impairment associated with the signals received by the plural antenna elements. This improved branch metric formulation is discussed at great length in the above-described IRC patent applications, and the interested reader is referred to those disclosures for further information regarding the IRC technique.

According to exemplary aspects of the present invention, the signal strength of the searcher beams can also be quantified using the desired channel tap estimate c. The strength is indicated by the value $c^H c$. The quality of the beam signal can be gauged from $c^H R^{-1} c$, where R is the impairment autocorrelation matrix generated by the impairment correlation estimator 600.

B. Cellular Radio Communication with Adaptive Beamforming

Figure 7:
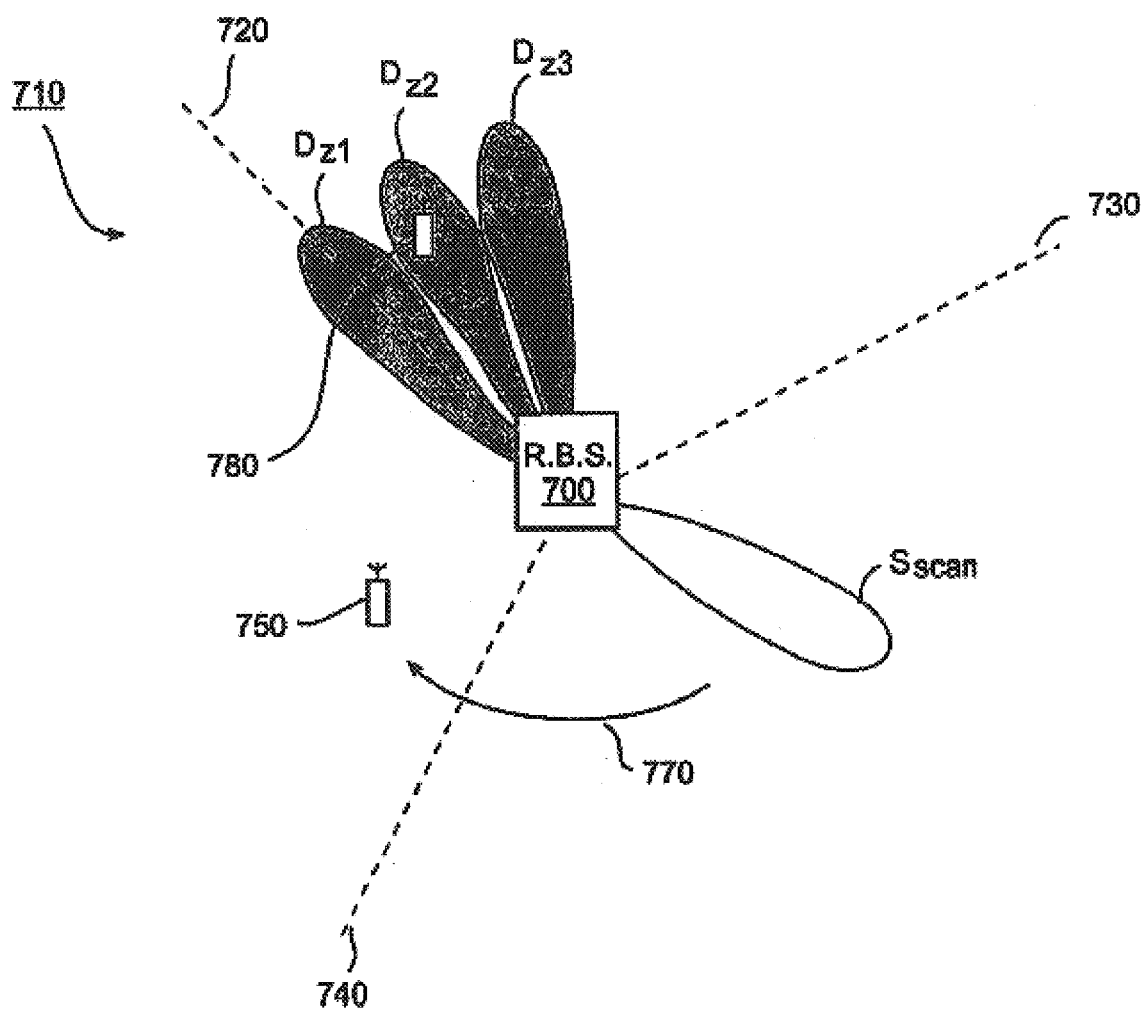
FIG. 7 shows a base station which uses a phased array with an adaptive beamforming processor according to exemplary aspects of the present invention.
Figure 8:
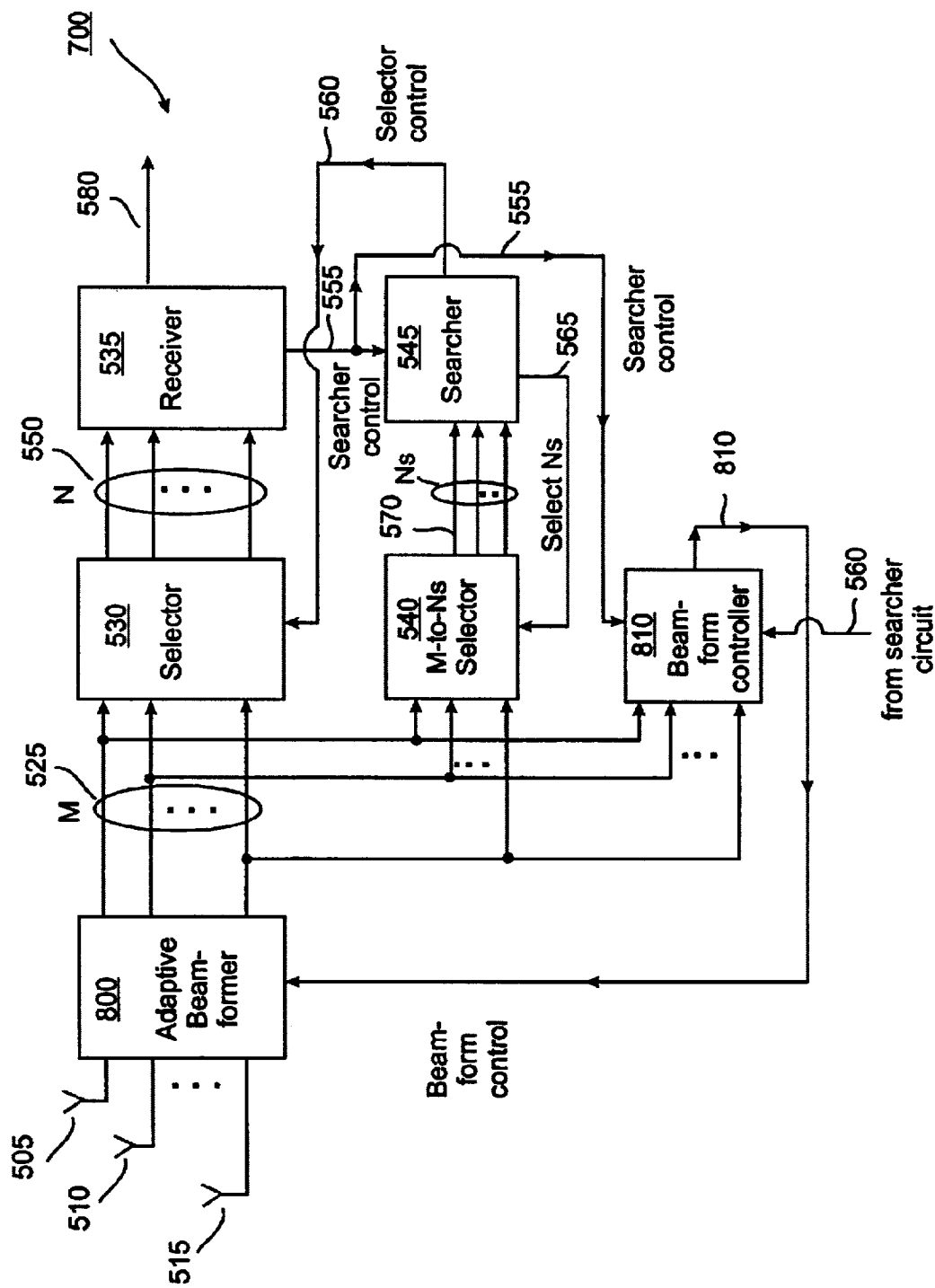
FIG. 8 shows an exemplary block diagram of processing circuitry used by the base station of FIG. 7.

FIGS. 7 and 8 illustrate a second exemplary embodiment of the present invention. In FIGS. 4–6, a fixed beamforming processor 520 is used, whereas in FIGS. 7 and 8, an adaptive beamforming processor 800 is used in the base station 700. The use of an adaptive beamforming processor 800 allows the base station 700 to selectively direct only the required number of beams toward the target terminals (such as terminal 780, which is serviced by beams $D_{z1}$, $D_{z2}$ and $D_{z3}$). The collection of beams is specifically tailored to maximize the signal-to-interference ratio of the signals received from the mobile terminal 780.

Furthermore, only one searcher beam $S_{scan}$ is used, or at least a smaller subset of searcher beams are used as compared to the example of fixed beamforming. The single searcher beam $S_{scan}$ is steered over a range of orientations. At each orientation, the base station measure the signal strength and/or signal quality of the searcher beam $S_{scan}$ (or some other measure), and from this information decides whether that orientation should be allocated a decoder beam $D_{zn}$. For instance, when the searcher beam reaches the vicinity of the new mobile terminal 750, the signal received using the searcher beam may indicate that a new decoder beam $D_{zn}$ should be established pointing toward the mobile terminal 750. The base station will respond by adjusting the weighting of the adaptive beamforming processor to direct a narrow beam $D_z$ in the desired direction.

One searcher beam $S_{scan}$ is shown in FIG. 7. This beam can scan a full 360 degrees, or depending on the local topography and objectives of the cellular system provider, the beam can scan only a sector thereof (such as one of the sectors defined by lines 720, 730 and 740). The weighting of the searcher beam can additionally be changed as it scans the cell 710 in the direction 770. The weighting could take into account any interference anomalies within the cell. For instance, the level of interference may be higher near the sector boundary denoted by line 730, and thus a stronger search beacon may be appropriate. As mentioned, more than one scanning searcher beam can be used to interrogate the region.

The above described functions can be implemented through the exemplary circuitry shown in FIG. 8. In this Figure, antenna elements 505, 510, 515, selector unit 530, receiver 535, M-to-$N_s$ selector 540 and searcher circuit 545 are substantially similar to the like-numbered modules shown in FIG. 5; thus, a detailed description thereof is omitted. FIG. 8 differs from FIG. 5 by replacing the fixed-beam processor 520 with the adaptive beamformer 800, and by including the beamform controller 810 which controls the adaptive beamformer 800.

Figure 2:
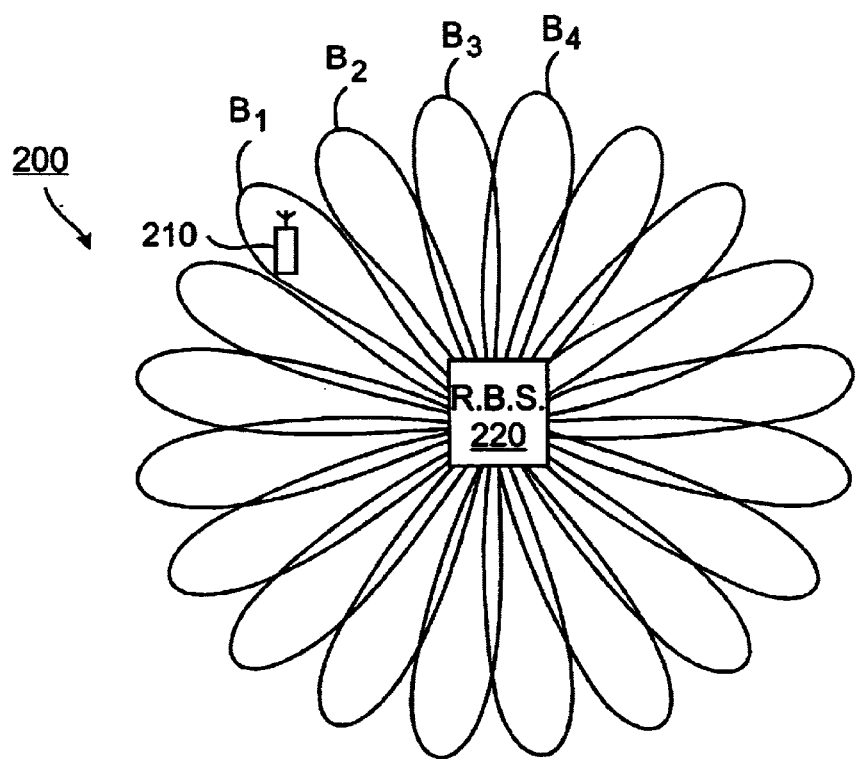
FIG. 2 shows a conventional base station which uses a phased array with a fixed beamforming processor.
Figure 3:
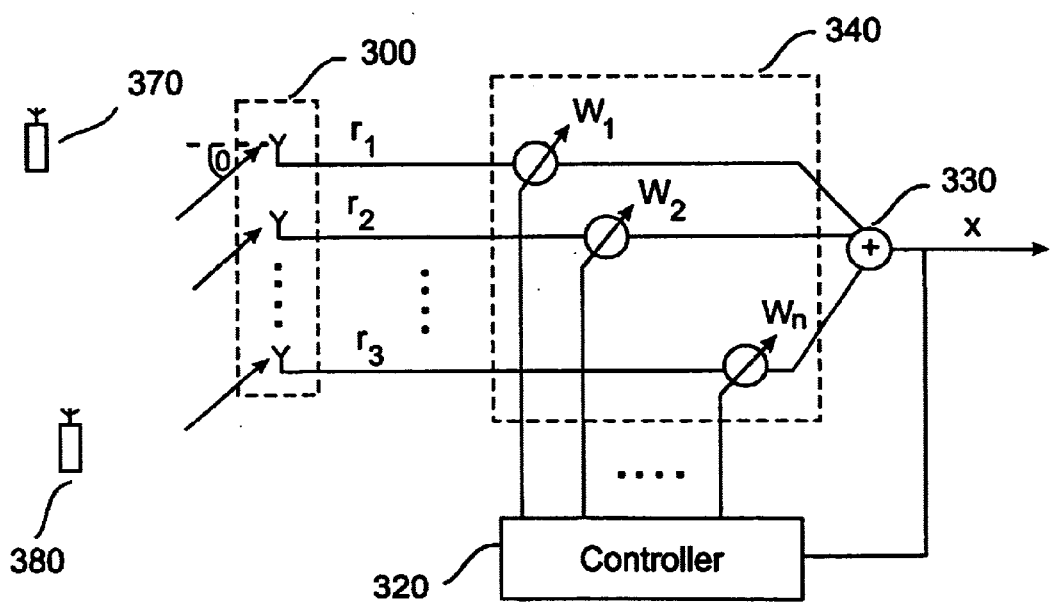
FIG. 3 shows a block diagram of a base station which uses a conventional adaptive phased array.

The adaptive beamformer 800 can comprise any conventional phased array adaptive beamformer controller, such as, but not limited to, the exemplary adaptive phased array beamformer shown in FIG. 2 of the present application. The adaptive beamformer unit 800, for instance can comprise a plurality of weighting modules which apply weighting to individual RF links. The controller 810 is used to control the weighting applied by the adaptive beamformer 800 on the basis of feedback information received from the output of the beamformer 800. The controller 810 also receives a searcher control signal 555 from the receiver 535, and a selector control signal 560 from the searcher circuit 545. Among other-control information, these signals inform the beamform controller of the members within the decoder set of beams so that it can adjust its antenna weighting accordingly.

C. Other Applications

The structure and techniques disclosed above are not limited to the conventional cellular radio communication environment. These techniques can be applied to other wireless applications, such as the indoor picocell radio communication environment, or to various satellite communication environments.

Figure 9:
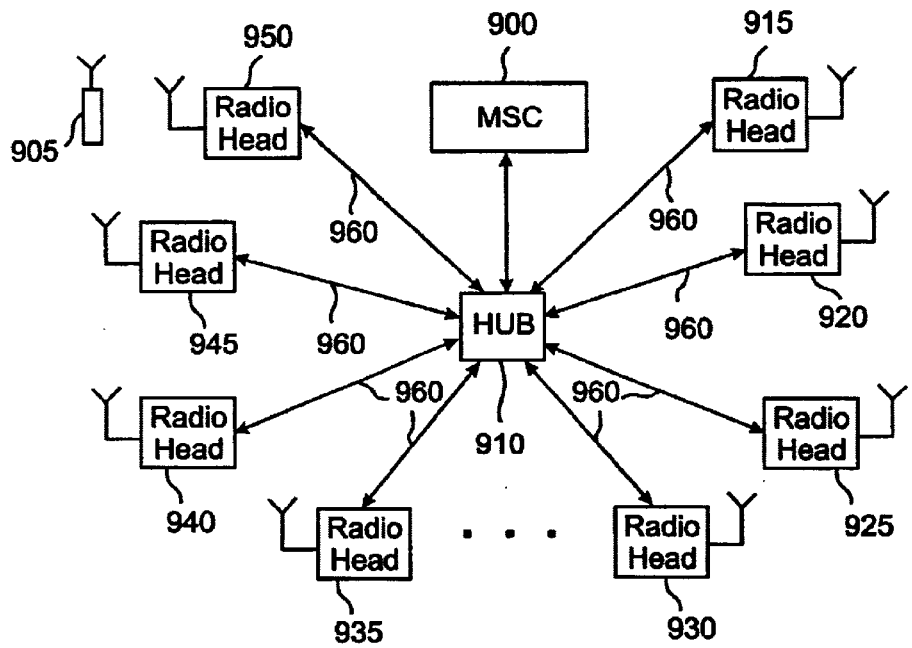
FIG. 9 shows an indoor radio communication system which uses radio heads to communicate with mobile terminals.

For instance, FIG. 9 depicts a radio system architecture which provides indoor radio communication. As shown, a central hub station 910 is coupled, through multiple high speed data transports 960, to a number of distributed radio head transceivers 915–950. The hub station 910 is also coupled, through an industry standard T1 TDM channel, to a mobile switching center (MSC) 900. The MSC 900 is used to connect the local radio system comprising the hub 910 and the radio heads 915–950 to other communication networks (e.g., the public switched telephone network). Thus, mobile users within the coverage area of the radio heads 915 to 950 (e.g. mobile user using terminal 905) can communicate with other local users in the same coverage area or with remote users in other networks. The hub station 910 and the radio heads 915–950 might be used, for example, to provide mobile telephone and pager service within an office building, airport, large auditorium, or manufacturing plant.

Figure 10:
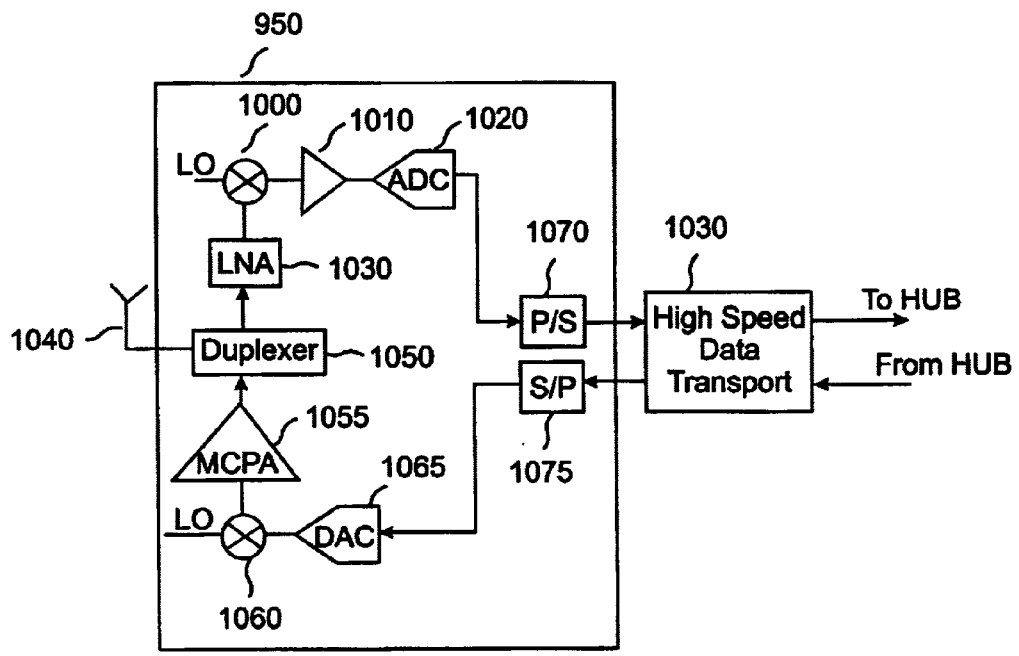
FIG. 10 shows an exemplary radio head for use in the system of FIG. 9.

FIG. 10 depicts an exemplary radio head (e.g. 950) which can be used to implement the system of FIG. 9. As shown, an RF antenna 1040 is connected to a duplexer 1050 which is in turn connected to a receive, or uplink, signal processing path and a transmit, or downlink, signal processing path. In the uplink signal processing path, the duplexer 1050 is coupled to a low-noise amplifier (LNA) 1030 which is in turn coupled to an uplink heterodyne mixer 1000. The uplink mixer 1000 is connected to an amplifier 1010 which is in turn connected to an analog-to-digital converter (ADC) 1020. The ADC 1020 feeds a parallel-to-serial data converter 1070 which in turn feeds an input of a high speed data transport 1080 connected to the hub station (not shown). In the downlink signal processing path, an output of the high speed data transport 1080 is coupled to a serial-to-parallel data converter 1075 which is in turn coupled to a digital-to-analog converter (DAC) 1065. The DAC 1065 feeds a downlink heterodyne mixer 1060 which feeds a multi-carrier power amplifier (MCPA) 1055. An output of the MCPA 1055 is connected to an input of the duplexer 1050. Those interested in further details regarding indoor cellular communication systems are referred to commonly assigned U.S. application Ser. No. 08/753,437, which is incorporated herein in its entirety by reference.

On the receive path, the signals collected by the high speed transport line 1080 are transferred to the hub station 910 (in FIG. 9). The hub station 910 processes the signals received from each radio head 915–950. In exemplary embodiments, the hub station 910 uses the same processing circuitry shown in FIG. 5 to extract wanted signals from unwanted signals received from the plurality of radio heads 915–950. In this case, however, instead of a phased array antenna having elements 505, 510, and 515 controlled by a fixed beam former 520, the circuit shown in FIG. 5 would receive input from the links 960 connected to the individual radio heads 915–950.

In the indoor context, the radio heads comprise a first set of "decoder radio heads". The decoder radio heads are used for processing a call from one or more mobile terminals located within the vicinity of the decoder radio heads. For instance, in the example of FIG. 9, radio heads 945 and 950 may serve as decoder radio heads for communication with mobile terminal 905 located within a particular portion of a facility.

The signals received from the decoder radio heads are processed by a coherent demodulator, represented by receiver 535 in FIG. 5. According to preferred embodiments, an interference-rejection-combining receiver disclosed in commonly assigned U.S. application Ser. No. 07/284,775, filed on Feb. 8, 1994, is used to process the signals provided by the decoder beams. This receiver combines signals received from each subset of decoder beams and separates the wanted signals from the unwanted (interfering) signals.

The remainder of the radio heads shown in FIG. 9 which are not allocated to decoding signals from mobile terminals are referred to as "searcher radio heads". As in the case of searcher beams, the hub station 910 uses the searcher radio heads to select candidates which should be added to the currently active set of decoder radio heads by successively examining the output of each searcher radio head. Those searcher radio heads (or combination of searcher radio heads) which meet prescribed criteria are selected and allocated to the task of processing a call from a mobile terminal. In a manner similar to that discussed in Section A of this patent, the hub station can detect the introduction and removal of mobile terminals from the indoor environment, and can also conserve processing resources by reducing the duty cycle of the searcher radio head processing.

Figure 11:
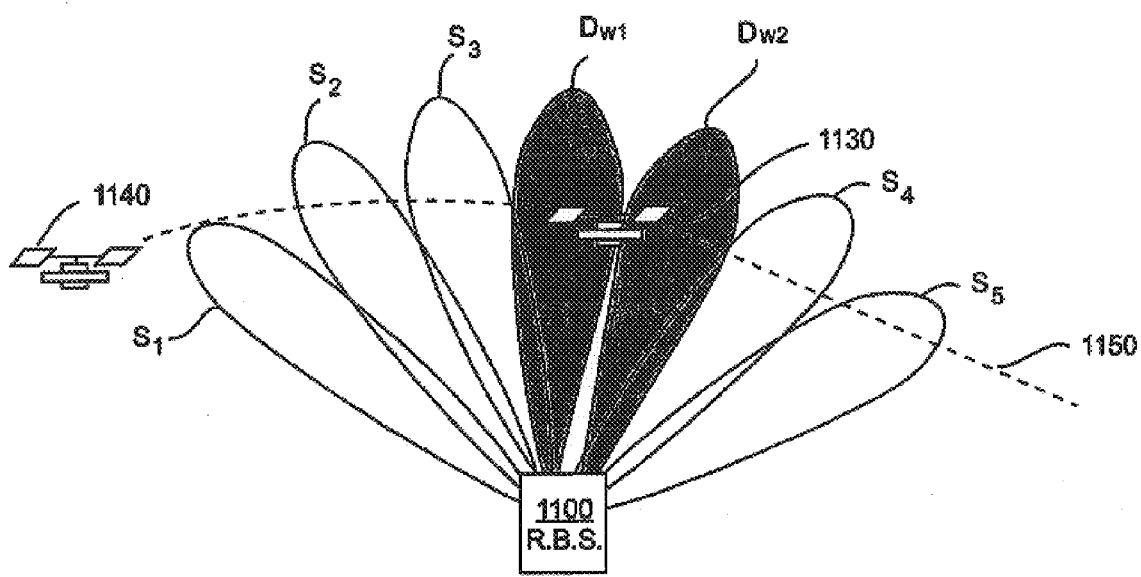
FIG. 11 shows a base station which communicates with one or more satellites using decoder beams selected by a searcher beam or beams.

FIG. 11 shows the use of a base station 1100 which generates a plurality of beams for communication with one or more orbiting satellites (e.g. satellite 1130 and 1140) travelling along trajectories (e.g. trajectory 1150). The base station 1100 can employ the same circuitry shown in FIGS. 5 or 8 to locate satellites within communication range, and also to select an optimal set of beams to communicate with the satellites once they have been detected.

Once again, the set of beams includes a first set of decoder beams (e.g. $D_{w1}$ and $D_{w2}$) which are used to receive and decode signals from one or more satellites (such as satellite 1130). The remainder of the beams ($S_1$–$S_5$) are used as searcher beams. The searcher beams are used to ensure that the base station 1100 is using an optimal set of decoder beams. FIG. 11 indicates that fixed beamforming is used, but a single scanning searcher beam can be used in conjunction with an adaptive beamforming processor (as in the embodiment of FIGS. 7 and 8). In other respects, the selection and processing of decoder and searcher beams is similar to the above-described embodiments and thus a detailed discussed thereof is omitted.

Searcher beam processing can also be performed on-board the satellite. In this embodiment, the satellite moves in prescribed trajectory and propagates a plurality of spot beams each having a prescribed coverage area. The spot beams move as the satellite advances in its trajectory. The set of spot beams includes a first set of decoder beams which are used to receive and decode signals from one or more ground terminals. The remainder of the beams are used as searcher beams. As before, the searcher beams are generally used to assist in the selection of one or more decoder beams for use in communicating with one or more ground terminals using IRC, or some other technique, to remove interference from the received signals. More particularly, the searcher beams assist in the identification of new and dropped calls, and assist in hand-over as a terminal moves from one beam coverage area to another.

Some satellites already employ conventional tracking systems which allow these satellites to determine the precise location of ground terminals. Searcher beam processing can be used in such satellites to either supplement this conventional tracking capability (e.g., by performing a redundancy check), or can simply alleviate some of the demands placed on the conventional tracking system (e.g., by relaxing the tracking precision requirements imposed on the conventional tracking system).

In the on-board satellite embodiment, fixed or adaptive beamforming can be used. The selection and processing of decoder and searcher beams is similar to the above-described embodiments (e.g., as depicted in FIGS. 5 and 8) and thus a detailed discussed thereof is omitted.

In yet another application, the searcher beams in any of the above embodiments can also carry paging messages in the downlink direction. The searcher beams can thus serve the joint role of searching for mobile terminals which wish to initiate a call, and also transmitting paging messages to any addressed pagers within a search area. In exemplary embodiments, the searcher beam(s) only periodically visits each region of the communication cell, e.g., at a reduced duty cycle. However, since paging messages can typically be communicated in short periodic bursts, the periodic nature of the searcher beam processing does not degrade the performance of the downlink transmission of paging messages.

In the case of pagers which lack transmitting ability, the searcher beams do not, properly speaking, "locate" the pagers, since the pagers have no ability to directly acknowledge reception of the searcher beams. The searcher beams simply broadcast information across a coverage area which may contain one or more addressed pagers. In the case of pagers which possess transmitting ability, however, the searcher beams can function in much the same manner as in the mobile radio cellular embodiment described above, and the searcher beams can be effectively used to locate the pagers and thereafter allocate one or more decoder beams thereto.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A radio communication base station for communication with at least one mobile terminal, said base station comprising:

a directional antenna for generating plural beams at plural respective fixed orientations;

an evaluator for comparing a signal obtained from said at least one beam with respect to measurement criteria, and, on the basis of said comparison, for indicating whether said signal is suitable for decoding; and a decoder for receiving said signal suitable for decoding, as determined by said evaluator, and for decoding the suitable signal;

said evaluator further operative to reassess a beam that was determined to be unsuitable for decoding to determine whether said unsuitable beam has subsequently become suitable for decoding.

2. A radio communication base station according to claim 1, where said evaluator determines which of said plural beams are suitable for decoding and said decoder receives and processes said beams which are suitable for decoding to remove interference therefrom.

3. A radio communication base station according to claim 1, where said evaluator includes processing logic for tracking a direction of at least one target mobile terminal and at least one interfering RF propagating entity.

4. A radio communication base station according to claim 1, wherein said evaluator detects new and dropped calls from a communication cell.

5. A radio communication base station according to claim 1, wherein said evaluator reassess a first subset of said beams which are determined to be unsuitable for decoding in a first time interval, and a second subset of said beams which are determined to be unsuitable for decoding in a second time interval.

6. A radio communication base station according to claim 1, wherein said evaluator reassess said beams which are determined to be unsuitable for decoding at a reassessment-time which is a function of a rate at which one or more mobile terminals are advancing within a radio communication cell.

7. A radio communication base station according to claim 1, wherein said evaluator reassesses said beams which are determined to be unsuitable for decoding for a reassessment interval which is a function of a degree of coding performed on said unsuitable beams.

8. A radio communication base station according to claim 2, wherein said evaluator reassess said beams which are determined to be suitable for decoding to ensure that said suitable beams remain suitable for decoding.

9. A radio communication base station according to claim 1, wherein said antenna comprises a tixed-beam phased array antenna.

10. A radio communication base station according to claim 1, wherein said measurement criteria comprises a measure of strength of said signal.

11. A radio communication base station according to claim 1, wherein said measurement criteria comprises a measure of quality of said signal.

12. A radio communication base station according to claim 1, wherein said measurement criteria comprises a combination of a measure of strength and a measure of quality of said signal.

13. A radio communication base station according to claim 1, wherein said base station is for use within an indoor radio communication network.

14. A radio communication base station according to claim 1, wherein said base station is for use in locating and communicating with at least one satellite as said mobile terminal.

15. A method for transmitting and receiving messages in a radio communication system, comprising:

generating a plurality of beams, each in a fixed orientation using a directional antenna;

comparing a signal obtained from at least one said beam with respect to measurement criteria, and, on the basis of said comparison, indicating whether the signal is suitable for decoding;

receiving the signal suitable for decoding, as determined by said comparison, and decoding the suitable signal; and if one or more beams are determined to be unsuitable for decoding, reassessing said unsuitable beams to determine whether they subsequently become suitable for decoding.

16. A method according to claim 15, wherein comparing a signal obtained from said at least one beam with respect to measurement criteria further comprises determining which of said plural beams are suitable for decoding; and receiving the signal suitable for decoding further comprises receiving and processing said beams which are suitable for decoding to remove interference therefrom.

17. A method according to claim 15, wherein said step of comparing includes tracking a direction of at least one target mobile terminal and at least one interfering RF propagating entity.

18. A method according to claim 15 wherein said step of comparing includes detecting new and dropped calls from a cell.

19. A method according to claim 15, wherein said step of reassessing comprises reassessing a first subset of said beams which are determined to be unsuitable for decoding in a first time interval, and reassessing a second subset of said beams which are determined to be unsuitable for decoding in a second time interval.

20. A method according to claim 15, wherein said step of reassessing comprises reassessing said beams which are determined to be unsuitable for decoding at a reassessment time which is a function of a rate at which one or more mobile terminals are advancing within a radio communication cell.

21. A method according to claim 15, wherein said step of reassessing comprises reassessing said beams which are determined to be unsuitable for decoding at a reassessment time which is a function of a degree of coding performed on said unsuitable beams.

22. A method according to claim 16, further comprising reassessing said beams which are determined to be suitable for decoding for continued suitability for decoding.

23. A method according to claim 15, wherein said antenna comprises a fixed beam phased array antenna.

24. A method according to claim 15, wherein said measurement criteria comprises a measure of strength of said signal.

25. A method according to claim 15, wherein said measurement criteria comprises a measure of quality of said signal.

26. A method according to claim 15, wherein said measurement criteria comprises a combination of a measure of strength and a measure of quality of said signal.

27. A method according to claim 15, wherein said radio communication system comprises an indoor radio communication network.

28. A method according to claim 15, wherein said radio communication system comprises at least one satellite and said at least one beam is used to locate and communicate with said at least one satellite.

29. A radio communication base station according to claim 1, wherein said decoder decodes the suitable signal so as to reduce interference in the suitable signal.

30. A method according to claim 15, wherein said decoding step decodes the suitable signal so as to reduce interference in the suitable signal.

31. A radio communication base station for communication with at least one mobile terminal, said base station comprising:
   a directional antenna for generating plural beams at plural respective orientations;
   a beamforming processor for altering the orientation of at least one said beam to generate an angularly displaced searcher beam;
   an evaluator for comparing a signal obtained from said searcher beam with respect to measurement criteria, and, on the basis of said comparison, for indicating whether the signal from said searcher beam is suitable for decoding;
   a decoder for receiving the signal suitable for decoding, as determined by said evaluator, and for decoding the suitable signal, wherein the signal is received for decoding by one of said plural beams other than said searcher beam.

32. A radio communication base station according to claim 31, where said evaluator includes processing logic for tracking a direction of at least one target mobile terminal and at least one interfering RF propagating entity.

33. A radio communication base station according to claim 31, wherein said evaluator detects new and dropped calls from a communication cell.

34. A radio communication base station according to claim 31, wherein said evaluator reassess beams which are determined to be unsuitable for decoding to determine whether said unsuitable beams have subsequently become suitable for decoding.

35. A radio communication base station according to claim 34, wherein said evaluator reassess a first subset of said beams which are determined to be unsuitable for decoding in a first time interval, and a second subset of said beams which are determined to be unsuitable for decoding in a second time interval.

36. A radio communication base station according to claim 34, wherein said evaluator reassess said beams which are determined to be unsuitable for decoding at a reassessment time which is a function of a rate at which one or more mobile terminals are advancing within a radio communication cell.

37. A radio communication base station according to claim 34, wherein said evaluator reassesses said beams which are determined to be unsuitable for decoding for a reassessment interval which is a function of a degree of coding performed on said unsuitable beams.

38. A radio communication base station according to claim 31, wherein said evaluator reassess said beams which are determined to be suitable for decoding to ensure that said suitable beams remain suitable for decoding.

39. A radio communication base station according to claim 31, wherein said measurement criteria comprises a measure of strength of said signal.

40. A radio communication base station according to claim 31, wherein said measurement criteria comprises a measure of quality of said signal.

41. A radio communication base station according to claim 31, wherein said measurement criteria comprises a combination of a measure of strength and a measure of quality of said signal.

42. A radio communication base station according to claim 31, wherein said base station is for use within an indoor radio communication network.

43. A radio communication base station according to claim 31, wherein said base station is for use in locating and communicating with at least one satellite as said mobile terminal.

44. A radio communication base station according to claim 31, wherein said decoder decodes the suitable signal so as to reduce interference in the suitable signal.

45. A method for transmitting and receiving messages in a radio communication system, comprising:
   generating plural beams at plural respective orientations using a directional antenna;
   altering the orientation of at least one said beam to generate an angularly displaced searcher beam;
   comparing a signal obtained from said searcher beam with respect to measurement criteria, and, on the basis of said comparison, indicating whether the signal from said searcher beam is suitable for decoding;
   receiving the signal suitable for decoding, as determined by said comparison, by one of said plural beams other than said searcher beam, and decoding the suitable signal.

46. A method according to claim 45, further comprising repeating said altering and comparing steps simultaneously with performing said receiving step.

47. A method according to claim 45, wherein receiving the signal suitable for decoding further comprises receiving and processing said beam that is suitable for decoding to remove interference therefrom.

48. A method according to claim 45, wherein comparing a signal obtained from said searcher beam with respect to measurement criteria further comprises tracking a direction of at least one target mobile terminal and at least one interfering RF propagating entity.

49. A method according to claim 45, wherein comparing a signal obtained from said searcher beam with respect to measurement criteria includes detecting new and dropped calls from a cell.

50. A method according to claim 45, further comprising reassessing said beams which are determined to be suitable for decoding for continued suitability for decoding.

51. A method according to claim 45, wherein said measurement criteria comprises a measure of strength of said signal.

52. A method according to claim 45, wherein said measurement criteria comprises a measure of quality of said signal.

53. A method according to claim 45, wherein said measurement criteria comprises a conbination of a measure of strength and a measure of quality of said signal.

54. A method according to claim 45, wherein said radio communication system comprises an indoor radio communication network.

55. A method according to claim 45, wherein said radio communication system comprises at least one satellite and said at least one beam is used to locate and communicate with said at least one satellite.

* * * * *